US012450994B2

(12) United States Patent
Beem, III

(10) Patent No.: US 12,450,994 B2
(45) Date of Patent: Oct. 21, 2025

(54) REMOTE CAMERA SYSTEM GATEWAY

(71) Applicant: Freedom Systems, Inc., Snohomish, WA (US)

(72) Inventor: Jimmie Albert Beem, III, Lake Stevens, WA (US)

(73) Assignee: Freedom Systems, Inc., Snohomish, WA (US)

( * ) Notice: Subject to any disclaimer, the term of this patent is extended or adjusted under 35 U.S.C. 154(b) by 20 days.

(21) Appl. No.: 18/188,185

(22) Filed: Mar. 22, 2023

(65) Prior Publication Data

US 2023/0306831 A1   Sep. 28, 2023

Related U.S. Application Data

(60) Provisional application No. 63/322,613, filed on Mar. 22, 2022.

(51) Int. Cl.
*H04N 23/661* (2023.01)
*G06F 3/16* (2006.01)
*G08B 13/196* (2006.01)
*H04N 23/63* (2023.01)

(52) U.S. Cl.
CPC ....... *G08B 13/19656* (2013.01); *G06F 3/167* (2013.01); *H04N 23/631* (2023.01); *H04N 23/661* (2023.01)

(58) Field of Classification Search
CPC .......... G08B 13/19656; H04N 23/661; H04N 23/631; G06F 3/167
See application file for complete search history.

(56) References Cited

U.S. PATENT DOCUMENTS

| 9,124,781 | B1* | 9/2015 | Roper | H04N 7/181 |
| 2011/0217026 | A1* | 9/2011 | Nakajima | G11B 27/329 |
| | | | | 386/353 |
| 2021/0360446 | A1* | 11/2021 | Laurans | H04N 23/611 |
| 2023/0171456 | A1* | 6/2023 | Sharma | G06F 3/14 |
| | | | | 725/38 |

* cited by examiner

*Primary Examiner* — Thai Q Tran
*Assistant Examiner* — Jose M Mesa
(74) *Attorney, Agent, or Firm* — Lee & Hayes, P.C.

(57) ABSTRACT

A system, method, and device for displaying video content captured by a camera system on a display device via a gateway. In examples, the gateway is connected to the camera system via a wireless network and is connected to the display device via a data transmission cable. A recording device obtains video data from the camera. The gateway receives the video data and a control signal from the recording device via a network. The gateway transmits a video signal that corresponds to the video data to the display device. Video content corresponding to the video data is presented on a display of the display device. In some examples, the gateway can receive user input via a graphical user interfaces it causes to be presented on the display or may receive user input via its own graphical user interface. Commands may be sent by the gateway to the camera system.

20 Claims, 3 Drawing Sheets

300

RECEIVE, BY A RECORDING DEVICE AND FROM A CAMERA, VIDEO DATA ASSOCIATED WITH VIDEO CONTENT CAPTURED BY THE CAMERA
302

RECEIVE, BY A GATEWAY AND FROM THE RECORDING DEVICE, A DATA STREAM INCLUDING THE VIDEO DATA AND A CONTROL SIGNAL ASSOCIATED WITH CONTROL BY THE GATEWAY OF AT LEAST ONE OF THE CAMERA OR THE RECORDING DEVICE
304

CAUSE PRESENTATION, BY THE GATEWAY AND ON A DISPLAY OF A DISPLAY DEVICE, THE VIDEO CONTENT ASSOCIATED WITH THE VIDEO DATA BY SENDING A VIDEO SIGNAL CORRESPONDING TO THE VIDEO DATA TO THE DISPLAY DEVICE
306

FIG. 3

REMOTE CAMERA SYSTEM GATEWAY

RELATED APPLICATIONS

This application claims priority to U.S. Provisional Patent Application No. 63/322,613, filed Mar. 22, 2022. The contents of which are incorporated in their entirety herein.

BACKGROUND

Video surveillance systems have become increasingly popular. Although devices exist that can wirelessly transmit video from a recording device to a television, there is no way to control or interact with the camera system using the same device. To allow for such control, video and control cables must be installed between the television and a recording device of the camera system. Because of this limitation, the recording device and the television have traditionally needed to be proximate to be each other. If they need to be further apart (e.g., for the recorder to be located in a hidden location to avoid theft and losing the recorded data), more cable is needed, making installation more labor-intensive and expensive. Further, traditionally, to transmit video data from a recording device to multiple televisions, splitters must be installed such that each of the televisions is able to receive and view video/images captured by the recording device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 depicts a non-limiting flow diagram illustrating a process for displaying video content from a camera system on a display device via a gateway, as described herein.

DETAILED DESCRIPTION

Figure 1:
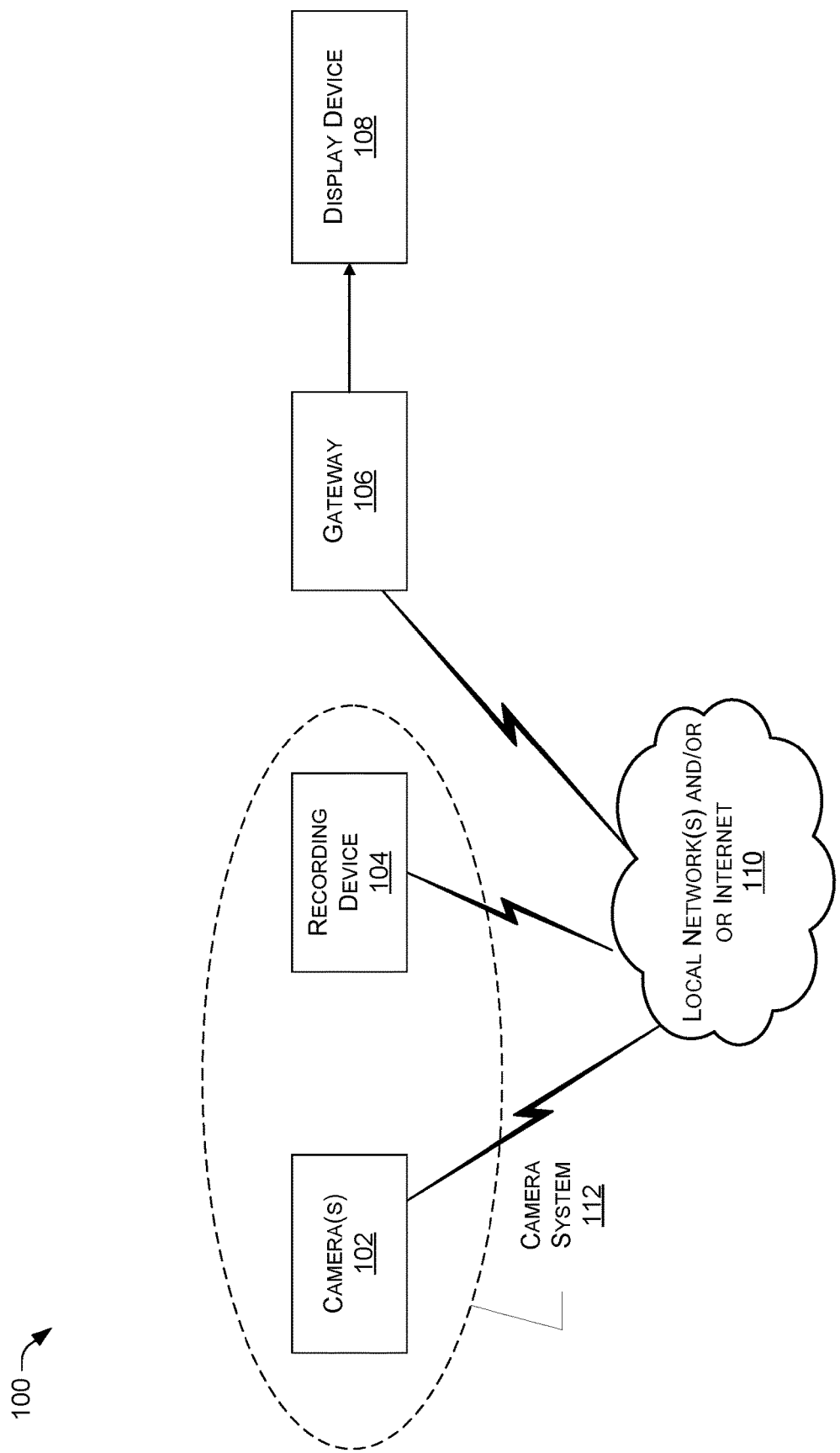
FIG. 1 is an illustrative environment for transmitting video data from a camera system to a display device via a gateway, as described herein.

Techniques described herein are directed to methods and systems for displaying surveillance video content on a display device via a camera system gateway ("gateway"). As used herein a "gateway" comprises a device that is capable of (1) receiving a data feed (comprising video data and a control signal) from one or more camera systems via a short-range and/or long-range data network, and (2) transmitting a video signal to a display device for display of video content corresponding to the video data, wherein the display device may not be directly connected to the data network. As used herein, a "recording device" comprises a device that least receives video data from one or more cameras and transmits video data to the gateway. A "camera system" as used herein refers to a system comprising one or more cameras and one or more recording devices. In examples, a video surveillance system is a type of camera system. In examples, a recording device may be embedded in a camera (that is, the camera system has no separate recording device). Techniques described herein may be applied to various configurations of camera systems such as those that include more than one camera and/or more than one recording device (separate or embedded in cameras). Using the techniques described herein, a user may view video content on a display device proximate the user to monitor video content from one or more remote camera systems by using the gateway. The cameras and recording devices may be different brands or manufacturers. An application executing on the gateway may be compatible with a camera, camera systems/settings, and/or a manufacturer of the camera. Applications used on the gateway may be developed using software development kits (SDKs). An SDK is a set of tools that provides a developer with the ability to build a custom application that may be operable on one or more platforms, which can be added on, or connected to, another application. SDKs may be used to generate or modify an application that allows display on, for example, a mobile phone to be able to be used for display on, for example, a television. One or more applications may work with a plurality of remote viewing applications from different manufacturers that will work on the gateway that are compatible with a plurality of operating systems.

In techniques described herein, a gateway receives a data stream comprising video data and a control signal from a recording device via a local network, an internet network, WiFi, or another type of network that allows for transmission of data between different devices, such as a cellular network. In this disclosure, video data and a control signal are discussed as separate components of a data stream for ease of explanation of the functionality of the system; however, the data stream may comprise a data that includes both the video data and the control signal. In examples, the gateway may transmit a corresponding video signal to a display device via a data transmission cable (e.g., high definition multimedia interface (HDMI), universal serial bus (USB), fiber, etc.) (including but limited to a video transmission cable) from a data transmission port of the gateway. Receipt of the control signal allows the gateway to control actions of one or more devices of the camera system. In examples, user input may be made to the gateway using at least one of (i) via a graphical user interface displayed on the display device (e.g., interaction using a remote control, mouse, keyboard, touchscreen, etc.), (ii) a voice command, or (iii) direct input to the gateway (e.g., via a display of the gateway, etc.). User input to the gateway may also set or change settings of the gateway.

For the purpose of this disclosure, a "display device" comprises an electronic device that can, in examples, present, on a display, video content received as a video signal via a data transmission cable (e.g., HDMI, USB, fiber, etc.). A display device may include but is not limited to a television, a desktop monitor, a laptop monitor, a tablet device, or any other device capable of presenting/displaying video content. Often in this disclosure, a television is used as an example display device.

The techniques described herein allow users to at least (i) view surveillance video content or other video content on a remote display device without running cable between the recording device/camera and the display device, (ii) view video content from a plurality of cameras on a single display device (one at a time or via split screen in different frames); (iii) use a broad range of display devices (in some instances regardless of manufacturer or model) as long as the display device has a video input that is compatible with a video output of the gateway. The gateway has the added benefit of being compact and inexpensive. In embodiments, the techniques described herein allow a user to use a local display device to view and manipulate video content captured by cameras on the other side of the user's house, across town, or anywhere within reach of a local network or internet connection. Further, techniques described herein allow a user to control components of the camera system remotely, for example, via user interaction with a graphical user interface presented by the gateway on a display of the display device In some examples, an application (e.g., a mobile application, a desktop application, a web application etc.) executing on the gateway causes presentation of one or more graphical user interfaces ("GUIs") on the display device. The GUIs may prompt or guide a user to configure and control the gateway and control components of the camera system.

The techniques described herein represent technological improvements to surveillance technologies at least by eliminating video and control cables between a camera and/or recording device and a display device. This may be accomplished by establishing a wireless connection between the camera or recording device on one hand and the gateway on the other, which allows wireless transmission of video data and a control signal to the gateway (in examples, via a router). The gateway can both transmit the video signal to the display device and perform remote control of the camera system via the gateway's connection to a same local network as the recording device or via another network. The gateway can connect to multiple recording devices and multiple cameras within or outside of a local network. The display device need not have its own connection to a network. Further, the gateway enables display of multiple camera streams on a same display device. Traditionally, the requirement of cables between cameras and/or recording devices on one hand and display devices on the other either hindered or prevented one or more of these functions.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is an illustrative environment 100 for transmitting video data from a camera system to a display device via a gateway, as described herein. The environment 100 includes a camera 102, a recording device 104, a gateway 106, a display device 108, and a network 110. In examples, the network 110 may comprise the internet or a local area network (LAN). In examples, the network 110 connects networked components via one or more of WiFi, data cable, cellular connection, etc. The network 110 may facilitate communications, and/or the exchange or transmission of data, between the recording device 104 and the gateway 106 and/or the camera 102 and the gateway. In some examples, the camera 102, the recording device 104, and the gateway 106 may all be part of a same network. The camera 102 and the recording device 104 may comprise a camera system 112. The environment 100 can also include one or more users, remote control devices (e.g., infrared remote control associated with the gateway, etc.), user input devices (keyboard, mouse, etc.), etc. For simplicity of explanation, a "camera system" 112 in the discussion of FIG. 1 refers to a single camera and a single recording device. However, as noted above, techniques described herein may be applied to differently configured video surveillance systems. Although environment 100 includes a recording device 104, alternative embodiments do not include a separate recording device.

The camera 102 is configured to capture video data, including both video and still images. In examples, the camera 102 comprises a video surveillance camera compatible with the recording device 104. In embodiments, at least one of the camera 102, the recording device 104, or camera system 112 is associated with a respective provider (e.g., manufacturer, distributor, retailer, etc.). A provider may generate or be associated with a particular application via which the gateway can communicate with the camera system 112.

The camera 102 may communicate with the recording device 104 via cable (not shown) or a wireless connection (e.g., Bluetooth, network 110, etc.). In embodiments, the camera 102 may communicate with the gateway 106 via network 110, without the presence of a recording device 104. In video surveillance systems that do not include a recording device 104 external to a camera 102, video data may be sent from the camera 102 directly to the cloud-based servers for storage and transmission. In examples, the recording device 104 can connect to a router via a cable (e.g., RJ45, etc.). It is contemplated that the recording device 104 may connect to a router via WiFi.

In examples, both a recording device 104 and a gateway 106 may communicate with camera 102. One or more of the recording device 104 or gateway 106 may requested and receive video data from camera 102.

The recording device 104 is configured to receive video data from the camera 102. Video data, audio data, image data, etc. may be stored by the recording device 104 (e.g., in internal hard drive, external storage, etc.) and/or be transmitted to another device. In examples, the recording device 104 may comprise a digital video recorder (DVR) or network video recorder (NVR). The recording device 104 may perform actions including, but not limited to compressing, storing, converting, or streaming the video data. The recording device 104 may further perform functions associated with motion detection, schedules, notifications, alarm input, camera manipulation, etc.

In examples described herein, the recording device 104 may transmit a data stream including video data and a control signal to the gateway 106, and the gateway 106 may transmit to the display device 108 via HDMI cable. The display device 108 may not have wireless capabilities (e.g., no WiFi, no internet connection, etc.), may not be able to receive a wireless video signal directly from recording device 104, and/or may not receive a control signal. By sending the data stream to the gateway 106 via the network 110, the video signal may be received by the display device 108 and control of the camera system 112 is possible via the gateway. In embodiments, a receiver may be placed between the gateway and the display device.

The gateway 106 may receive the data stream from the recording device 104, via an application executing on the gateway 106. In embodiments, the video data may be received from the recording device 104 as a live feed. The gateway 106, via an application executing on the gateway 106, may transmit the video signal to the display device 108 via a data transmission cable (e.g., HDMI, USB cable, etc.). HDMI, for example, may transmit uncompressed video and embedded audio signals. The control signal allows the gateway 106 to send commands to the camera system 112. As described above, the gateway 106 uses the display device 108 as its display. The gateway 106 may cause presentation of a graphical user interface on the display device 108. In examples, user input to the graphical user interface may change the settings of the gateway 106 and/or user preferences of user of the gateway 106 as well as initiate transmission of commands to the camera system 112 (e.g., for manipulation of the video data, etc.) via an application executing on the gateway 106.

Video content displayed on the display device 108 will be limited to the lower of the video resolution of the camera 102 and the video resolution of the display device 108 receiving the video signal. In an example, with a 2 mp camera (1080p) and a 4K monitor, the video output on a display device will be no more than 1080p. In another example, with a 4 k camera and a 1080p monitor, the video output will be no more than 1080p resolution.

In a hypothetical scenario that implements embodiments of the techniques described herein, a homeowner has installed a first surveillance camera system at the homeowner's house. The camera system includes a surveillance camera mounted to the outside of the house. The homeowner also has installed a second surveillance camera system at the homeowner's place of business, across town. The homeowner wishes to watch video from both cameras at once, from the television in the living room of her house. To do so, she connects a gateway to her living room television via an HDMI cable and selects the home's WiFi network to connect the gateway. The gateway receives video data from a recording device of the first camera system via a local area network to which both the recording device and the gateway are connected via a router. The gateway also receives video data from a recording device of the second camera system via the internet, which may also be delivered to the gateway via the router. Via a user interface on her television, the homeowner selects the two cameras for viewing, selects a split screen format, and is then able to watch security/surveillance video of both locations at once. Further, she can set up a user profile to save her preferences (e.g., for which cameras to watch and the appearance of the display, etc.) Upon seeing suspicious activity via the camera at her place of business, she uses a remote control or her mobile device to request that the video content start from an earlier point in time so that she can review the activity. The gateway relays the command to the recording device associated with the relevant camera, and the recording device transmits video data corresponding to the point earlier in time.

In another hypothetical scenario that implements embodiments of the techniques described herein, a restaurant owner can view surveillance video from all of his restaurants from a television in his family room. He can choose specific cameras from each location and open them simultaneously for viewing.

Figure 2:
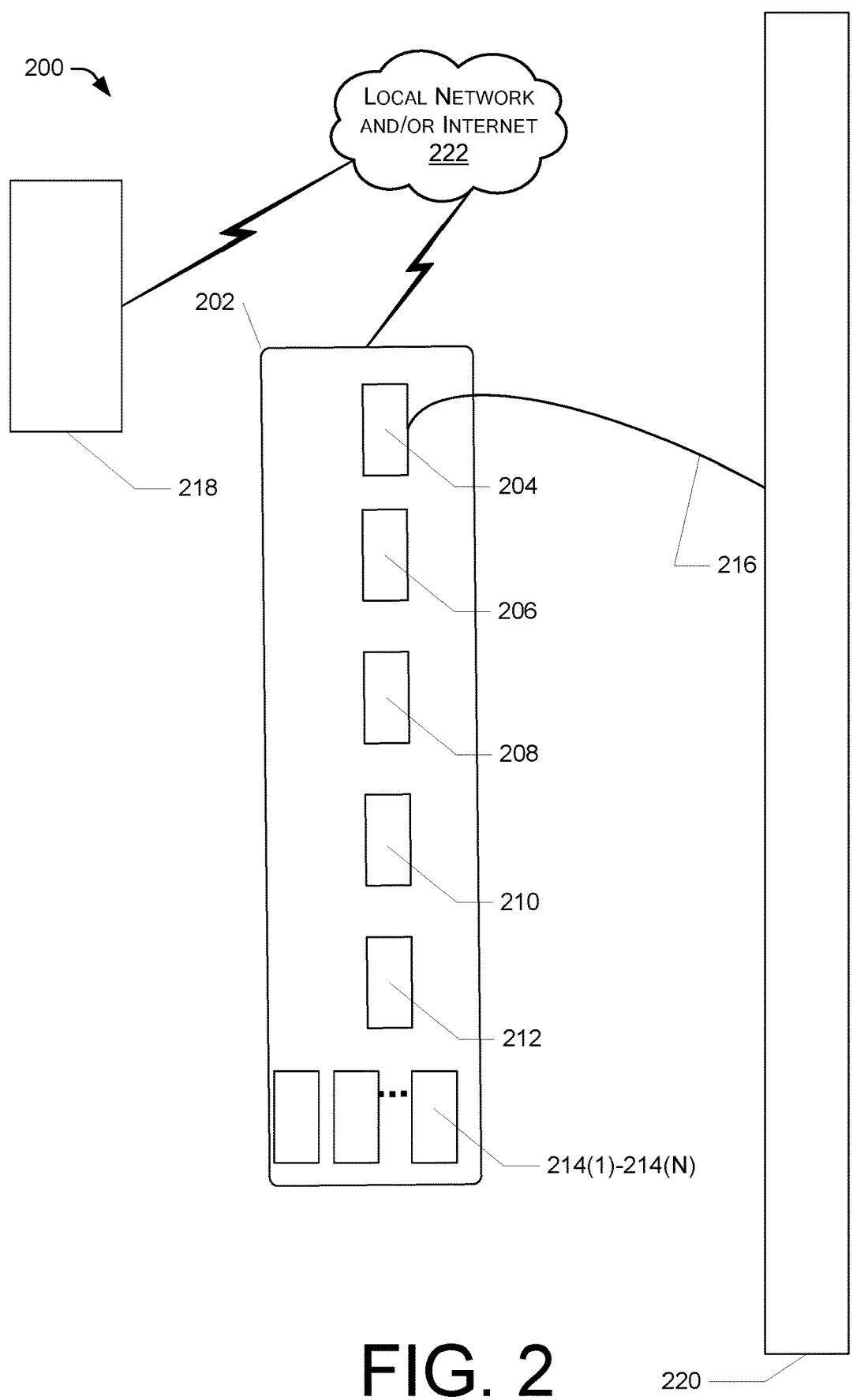
FIG. 2 is an orthogonal side view of a first embodiment of a gateway depicted within a system comprising a recording device, a gateway, and a display device, described herein.

The gateway 106 may have multiple embodiments. A first embodiment (an example of which is illustrated in FIG. 2) comprises a small form factor box with a plurality of ports that is connected to the display device 108 via a cable. A second embodiment (not shown) comprises a "stick" device which may have a smaller form factor and connects directly to a data port (e.g., HDMI, USB, etc.) of the display device, without a cable. In the second embodiment, gateway components may be fewer and/or smaller (e.g., its ports may only be a HDMI port and a power inlet), but the second embodiment may perform the same functions as the first embodiment with regard to the transfer of a video signal for display of video content on a display device. A third embodiment of the gateway 106 comprises a desktop or laptop computer, which uses its own display and/or video transmission to a display device for viewing video content.

FIG. 2 is an orthogonal side view of a first embodiment of a gateway depicted within a system 200 comprising a recording device, the gateway, and a display device, described herein.

FIG. 2 includes gateway 202, recording device 218, display device 220, and local network and/or internet 222. FIG. 2 is meant to provide a general representation of the types of ports and modes of connection of the gateway 202 to the display device 220 and to the recording device 218. However, the size, shape, and placement of the components is not meant to be limiting.

In examples, the recording device 218 sends a data stream including a control signal and video data via a local network and/or internet 222 to the gateway 202, and the gateway 202 sends a video signal to the display device 220 via a data transmission cable 216 (also referred to as a data transmission cable herein). In examples, the network 222 may be a local area network or the internet. In embodiments (not shown), the gateway 202 may receive video data directly from the camera 102 rather than the recording device 218.

The gateway 202 (which may be the gateway 106 of FIG. 1) comprises a housing that encloses internal components of the gateway 202 and that includes a plurality of ports. The housing may be made of at least one of plastic, metal, etc., and can have a small form factor. Individual ports of the plurality of ports may vary, but the plurality of ports includes at least a video transmission port 204 (e.g., HDMI, etc.) by which a video signal may be transmitted to the display device 220, and a power inlet 206 to receive power (e.g., via an adapter, etc.). The plurality of ports may also include one or more USB ports 208, one or more LAN ports 210, and one or more wireless receiver ports 212. The plurality of ports may also include one or more additional ports 214(1) to 214(N) which may include, for example, one or more microUSB ports, one or more digital optical ports, one or more HD card ports, etc., The additional ports 214(1)-214(N) may but need not be a same type of port as any of the other ports.

In examples, the one or more USB ports 208 may be used to connect a wired mouse, keyboard, wireless receiver, etc., or a wireless mouse, keyboard, wireless receiver, etc. Additionally, one or more USB ports 208 may be used in addition or as an alternative to connect the gateway 202 and the display device 220. Moreover, the one or more USB ports 208 may connect a power adapter.

The data transmission cable 216 (e.g., HDMI, USB, SDI, fiber, etc.) may connect the video transmission port 204 of the gateway 202 to a video-in port (not shown) corresponding to the video input (e.g., HDMI, USB, SDI, fiber, etc.) on the display device 220. The gateway 202 may use the data transmission cable 216 to transmit a video signal to the display device 220. Other means of transmitting video data (and in embodiments, audio data or other data) from the gateway 202 to the display device 220 are contemplated.

As noted above, the gateway 202 may include WiFi capability, either via a built-in via internal wireless adapter/receiver (e.g., LAN card, adapter card, etc.) (not shown) or an external wireless adapter (e.g., connected USB port 208, wireless receiver port 212, etc.). In examples, the gateway 202 may connect to a router (not shown) of a local network via WiFi. Additionally or alternatively, one or more LAN ports 210 (e.g., RJ45 or Ethernet ports) may connect the gateway 202 to the router. In examples, the gateway 202 may also have a direct wireless internet connection to send and receive data.

Application(s) executing on the gateway 202 may be updated remotely. In examples, a push update may be sent to the gateway.

FIG. 3 depicts a non-limiting flow diagram illustrating a process for displaying video content from a camera system on a display device via a gateway, as described herein.

Block 302 illustrates receiving, by a recording device and from a camera, video data associated with video content captured by the camera. In examples, the camera 102 may capture video and/or images continuously or periodically. In examples, the camera 102 may capture video based at least in part a command from the recording device 104 or another device. The recording device 104 may record data automatically according to predetermined settings, rules, and/or manual control, and may record video data obtained from the camera 102 continuously or periodically.

Block 304 illustrates receiving, by a gateway and from the recording device, a data stream including the video data and a control signal associated with control by the gateway of at least one of the camera or the recording device. The camera 102 and the recording device 104 may comprise the camera system 112 described herein. In some examples, the gateway 106 may send one or more commands to at least one of the recording device 104 or the camera 102 via the control signal. In some examples, the one or more commands may be associated with at least one of playback, storage, transmission, etc. of video data. Additionally, the one or more commands may be associated with operations, configuration, and/or settings of the recording device 104 or camera 102 themselves, independent of particular video data. The gateway 106 may send commands via a local network or via the internet.

Block 306 illustrates causing presentation, by the gateway and on a display of a display device, the video content associated with the video data by sending a video signal corresponding to the video data to the display device. The video signal may be sent via a data transmission cable 216 or directly between an output port of the gateway 106 and an input port of the display device 108. The video signal may be analog or digital, which may depend on the type of cable or connection between the gateway 106 and the display device 108. The video data may be received by the gateway 106 and processed by an application executing on the gateway 106, which may convert or reformat the data for transmission as a video signal to the display device 108. In some examples, the video content may be streaming video content. In some examples, the video content may be still images. Video content displayed at the display device 108 may comprise a portion of video content captured by the camera 102, or may be modified by the recording device 104 or gateway 106 before the video signal is received by the display device 108.

Gateway 202 may include other components not illustrated in FIG. 2 and/or not described herein. The gateway may also include one or more processors (not shown) and one or more non-transitory machine-readable computer readable media ("CRM") (not shown) that stores various modules, applications, programs, and/or other data. The CRM may include instructions that, when executed by the one or more processors, cause the processors to perform the operations described herein. That is, the gateway may include one or more processors, CRM, logic, components, modules, computer-executable instructions, etc. that facilitate operations performed by the gateway as described herein.

The processor(s) may include a central processing unit (CPU), a graphics processing unit (GPU), both CPU and GPU, or other processing units or components known in the art. Additionally, each of the processor(s) may possess its own local memory, which also may store program modules, program data, and/or one or more operating systems. The processor(s) may include a central processing unit (CPU), a graphics processing unit (GPU), both CPU and GPU, or other processing units or components known in the art. Additionally, each of the processor(s) may possess its own local memory, which also may store program components, program data, and/or one or more operating systems. In examples, the one or more operating systems may comprise a standard "off the shelf" operating system (e.g., ANDROID® OS, ANDROID TVR OS, iOS®, etc.). The one or more operating systems may be modified at or after manufacture of the gateway or after installation on the gateway.

Each of the one or more processors may be a single processing unit or a number of processing units, and may include single or multiple computing units or multiple processing cores. The one or more processors may be implemented as one or more microprocessors, microcomputers, microcontrollers, digital signal processors, central processing units, state machines, logic circuitries, and/or any devices that manipulate signals based on operational instructions. For example, one or more processors may be one or more hardware processors and/or logic circuits of any suitable type specifically programmed or configured to execute the algorithms and processes described herein. One or more processors may be configured to fetch and execute computer-readable instructions stored in computer-readable media, which may program one or more processors to perform the functions described herein.

Moreover, embodiments may be provided as a computer program product including a CRM having stored thereon instructions (in compressed or uncompressed form) that may be used to program a computer (or other electronic device) to perform processes or methods described herein. The CRM may include, but is not limited to, hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Computer-readable media may include volatile and nonvolatile memory and/or removable and non-removable media implemented in any type of technology for storage of information, such as computer-readable instructions, data structures, program components, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the gateway, computer-readable media can be a type of computer-readable storage media and/or can be a tangible non-transitory media to the extent that when mentioned, non-transitory computer-readable media exclude media such as energy, carrier signals, electromagnetic waves, and signals per se.

Additional components may include but are not limited to: network interface(s), communication interface(s), input/output device(s), display(s), other modules and data, etc.

Computer-readable media may be used to store any number of functional components. In many implementations, these functional components comprise instructions or programs that are executable by the one or more processors. One or more applications executing on the gateway may provide functional components.

In examples, the one or more applications are associated with and/or executable on the gateway, and the application(s) may be associated with one or more of the functional components stored in the computer-readable media. In embodiments, the one or more applications may include a camera system application, which may be specific to one or more manufacturers of camera systems of the cameras producing the video data. The gateway may have more than one more camera system applications installed. At least one of the one or more camera system applications may be compatible with multiple camera systems. The applications are configured to process video data and control signal received by the gateway in a manner compatible with particular camera system specifications. The application(s) may be pre-installed on the gateway before provision to a user or may be later installed on the gateway. The application(s) may be executed by the one or more processors of the gateway to process the video data and cause transmission of a video signal to the display device.

Functional components may include but are not limited to a communication component, a graphical interface component, a transmission component, a user input component, a control component, and an integration component.

The communication component communicates with both the with camera system and the display device. The communication component may transmit communications from a user (e.g., via user input at the gateway via a GUI displayed on the display device, via the user input and/or graphical interface components, etc.) to the camera system. The communication component may also send a notification to a user device via text, direct message, website, an electronic mail message, or by any other means by which the communication component may communicate to the user. In an example, the communication component may send a notification to a user that a new video stream is being received, that the gateway is malfunctioning, etc. Based at least in part on the launching of a camera system application, the communication component may send a request to the graphical interface component (discussed below).

The graphical user interface component can generate one or more graphical user interfaces (GUIs) and cause presentation on a display of a display device. The one or more GUIs may be configured to present one or more selectable controls for settings and preferences for the gateway (e.g., time, display preferences, etc.), controls for the video playback (e.g., back, pause, etc.), camera selection, display style (e.g., split screen between cameras, single camera, etc.), sending video data, etc. Further, graphical interface component may determine arrangement of selectable controls, functions of selectable controls, design, content, etc. of the GUI(s). GUI input may be relayed to the gateway, and the gateway may transmit corresponding commands to the camera system. The graphical interface component may be configured to automatically, or in response to user input, determine how the GUI(s) look to the user, and may assign various functions to selectable icons presented via the GUI(s). In various examples, the GUIs may be personalized to particular users, based on a user profile stored by the gateway.

Throughout this disclosure, reference is made to presenting a GUI. It should be noted that in some examples, an application (e.g., camera system application, etc.) can generate instructions for presenting a GUI and can execute such instructions for presenting the GUI. Alternatively, in some examples, a first application can generate the instructions and send the instructions to a second application. In such examples, the second application can execute the received instructions for presenting the GUI. In some examples, the first application and the second application can be executing on same computing devices or different computing devices.

A transmission component of the gateway receives video data and a control signal from the recording device and transmits a video signal to the display device for display of the video content associated with the video signal. The video transmission component may convert a format of the video data received to a different format to before transmitting to the display device.

A user input component may be configured to receive user input to the gateway from a user, whether via a GUI or otherwise. User input may be via from remote control that may be paired to the gateway. In examples, a user may provide user input via GUI(s) presented on a display device as described relative to the graphical interface component. Additionally, the user input component may configure a mobile device of a user to act as a remote control for user input to the gateway. In embodiments, pairing between a remote control and a gateway may be performed by a camera system application or another application executing on the gateway. Further, the user input component may receive input from a keyboard or other input device operated by a user and connected to the gateway, in examples, through a USB port or wireless receiver.

The control component may remotely configure and control the camera system based at least in part on receiving a control signal from the recording device. In examples, the gateway may transmit a control signal to the camera system that causes the camera system to perform functions with regard to the camera system and/or video data. In examples, the control component may receive instructions from at least one of the user input component, communication component, or another component for relaying instructions to the camera system. Actions the camera system may take include, but are not limited to, pausing playback of video content, navigating to a particular point in video content, changing a speed of playback of the video content, saving a portion of video content, generating a snapshot of a frame of video content, deleting video content, tagging or bookmarking video content, transmitting a portion of video content to one or more gateways or other destinations (e.g., mobile device, external hard drive, etc.), analyzing video content, adjusting camera angle, turning on and off cameras, etc.

An integration component configures the gateway to communicate with other devices within a network, that is, integrating devices such that activity on one device may affect activity on another device, or such that the gateway can work in concert or be controlled all at once, etc. For example, in an integrated system in which a gateway and camera system are networked, user input on a GUI displayed on a display device may be received at the gateway (for example, user input of suspicious activity during a live stream video), and the control component and transmission component may work with the integration component to communicate to the camera system (e.g., to turn on a flood light).

Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
   one or more first cameras;
   a first recording device configured to receive first video data from the one or more first cameras;
   one or more second cameras;
   a second recording device configured to receive second video data from the one or more second cameras;
   a monitor;
   a data transmission cable; and
   a gateway comprising:
      a housing;
      one or more ports, including at least a data transmission port and a power inlet;
      one or more processors; and
      one or more non-transitory computer-readable media storing instructions that, when executed by the one or more processors, cause the gateway to perform operations comprising:
         receiving, by the gateway and from the first recording device via a first network, a first data stream comprising (i) the first video data and (ii) a first control signal associated with first control of the first recording device, wherein the first video data is received by the first recording device from a first camera of the one or more first cameras that captured the first video data;
         receiving, by the gateway and from the second recording device via the first network or a second network, a second data stream comprising (i) the second video data and (ii) a second control signal associated with second control of the second recording device, wherein the second video data is received by the second recording device from a second camera of the one or more second cameras that captured the second video data;
         causing first presentation, on the monitor, of first video content corresponding to the first video data by transmitting, by the gateway and to the monitor via the data transmission cable, a first video signal corresponding to the first video data; and
         causing second presentation, on the monitor, of second video content corresponding to the second video data, while the first video content is being presented, by transmitting, by the gateway and to the monitor via the data transmission cable, a second video signal corresponding to the second video data.

2. The system of claim 1, wherein the gateway receives the first data stream from the first recording device via internet or a local network.

3. The system of claim 1, further comprising a router, wherein the gateway receives the first data stream from the first recording device via the router.

4. The system of claim 1, wherein the gateway is configured to receive user input via at least one of (i) first interaction with a first graphical user interface displayed on the monitor, (ii) voice command to the gateway, or (iii) second interaction with a second graphical user interface displayed on a display of the gateway.

5. The system of claim 1, wherein the operations further comprise:
   sending, by the gateway and to the first recording device, via the first control signal, a command for the first recording device to perform an action associated with one or more of the one or more first cameras, the first recording device, or the first video data.

6. The system of claim 4, wherein the user input comprises an instruction to one or more of pause playback of the first video content, navigate to a particular point in the first video content, change a speed of playback of the first video content, set a display style for the first video content, save a portion of the first video content, generate a snapshot of a frame of the first video content, delete the first video content, tag or bookmark the first video content, transmit the portion of the first video content, analyze the first video content, adjust an angle of at least one first camera of the one or more first cameras, power on the at least one first camera, or power off the at least one first camera.

7. A method comprising:
   receiving, by a gateway and from a first recording device, a first data stream comprising (i) first video data and (ii) a first control signal associated with first control of the first recording device, wherein the first video data is received by the first recording device from a first camera that captured the first video data;
   receiving, by the gateway and from a second recording device, a second data stream comprising (i) second video data and (ii) a second control signal associated with second control of the second recording device, wherein the second video data is received by the second recording device from a second camera that captured the second video data;
   transmitting, by the gateway and to a monitor via a data transmission cable or directly between the gateway and the monitor, a first video signal corresponding to the first video data and a second video signal corresponding to the second video data;

causing first presentation, by the gateway, of at least one of first streaming video content or one or more first still images corresponding to the first video data via a display associated with the monitor; and causing second presentation, by the gateway, of at least one of second streaming video content or one or more second still images corresponding to the second video data via the display associated with the monitor while the first streaming video content or the one or more first still images are being presented.

8. The method of claim 7, wherein the data transmission cable comprises a high definition multimedia interface (HDMI) cable, a universal serial bus (USB) cable, or a fiber cable.

9. The method of claim 7, wherein the gateway receives the first data stream from the first recording device via internet or a local network.

10. The method of claim 7, wherein the display comprises a first display, and wherein the gateway is configured to receive user input via at least one of (i) first interaction with a first graphical user interface displayed on the display, (ii) voice command to the gateway, or (iii) second interaction with a second graphical user interface displayed on a second display of the gateway.

11. The method of claim 10, wherein causing first presentation of the at least one of the first streaming video content or the one or more first still images comprises causing first presentation of the first streaming video content, and wherein the user input is associated with an instruction to one or more of pause playback of the first streaming video content, navigate to a particular point in the first streaming video content, change a speed of playback of the first streaming video content, set a display style for the first streaming video content, save a portion of the first streaming video content, generate a snapshot of a frame of the first streaming video content, delete the first streaming video content, tag or bookmark the first streaming video content, transmit the portion of the first streaming video content, analyze the first streaming video content, adjust an angle of the first camera, power on the first camera, or power off the first camera.

12. The method of claim 7, further comprising:
causing third presentation, on the display, of one or more user interfaces, wherein the one or more user interfaces are configured to present selectable controls associated with at least one of settings, user preferences, one or more first controls for video playback, or one or more second controls for sending at least one of the first video data or the second video data.

13. The method of claim 7, wherein transmitting the first video signal and the second video signal directly between the gateway and the monitor comprises transmitting the first video signal from a first data port of the gateway to a second data port of the monitor.

14. The method of claim 7, wherein the first video data is stored in a memory of the first recording device.

15. A gateway comprising:
a housing;
one or more ports, comprising at least a data transmission port and a power inlet, wherein the data transmission port is configured to transmit video signals via a data transmission cable;
one or more processors; and
one or more non-transitory computer-readable media storing instructions that, when executed by the one or more processors, cause the gateway to perform operations comprising:
receiving, from a first recording device via a first network, a first data stream comprising (i) a first control signal associated with first control of the first recording device, and (ii) first video data received by the first recording device from one or more first cameras that captured the first video data;
receiving, from a second recording device via the first network or a second network, a second data stream comprising (i) a second control signal associated with second control of the second recording device, and (ii) second video data received by the second recording device from one or more second cameras that captured the second video data;
transmitting, to a monitor, a first video signal corresponding to the first video data and a second video signal corresponding to the second video data, wherein the first video signal and the second video signal are transmitted via the data transmission cable;
causing first presentation of first video content corresponding to the first video data via a display associated with the monitor; and
causing second presentation of second video content corresponding to the second video data via the display associated with the monitor while the first video content is being presented.

16. The gateway of claim 15, further comprising a wireless receiver, wherein input to the gateway from a keyboard or other input device is received via the wireless receiver.

17. The system of claim 1, the operations further comprising:
processing the first video data, wherein the processing of the first video data comprises converting or reformatting the first video data for transmission as the first video signal to the monitor.

18. The method of claim 7, wherein the first recording device is embedded in the first camera.

19. The method of claim 7, further comprising:
sending, by the gateway and to the first recording device, via the first control signal, a command for the first recording device to perform an action associated with the first camera, the first recording device, or the first video data.

20. The gateway of claim 15, wherein the first data stream is received from the first recording device via a router.

* * * * *